United States Patent [19]

Plummer

[11] Patent Number: 4,701,045

[45] Date of Patent: Oct. 20, 1987

[54] METHOD AND APPARATUS FOR REDUCING OPTICAL ARTIFACTS

[75] Inventor: William T. Plummer, Concord, Mass.

[73] Assignee: Polaroid Corporation, Cambridge, Mass.

[21] Appl. No.: 822,852

[22] Filed: Jan. 27, 1986

[51] Int. Cl.[4] ............................................. G03B 27/72
[52] U.S. Cl. ...................................... 355/20; 355/52; 355/81
[58] Field of Search ............................. 355/20, 52, 81

[56] References Cited

U.S. PATENT DOCUMENTS 2,960,019  11/1960  Craig ..................................... 355/81
4,457,618   7/1984  Plummer .............................. 355/20

OTHER PUBLICATIONS

IEEE Transactions on Broadcasting, vol. BC-22, No. 4, Dec. 1976.

Primary Examiner—Monroe H. Hayes
Attorney, Agent, or Firm—Leslie J. Payne

[57] ABSTRACT

There is disclosed a process and apparatus by which the energy distribution of preselected areas of illumination is altered by diffusion so as to minimize the visual effects of artifacts on image recording material.

11 Claims, 1 Drawing Figure

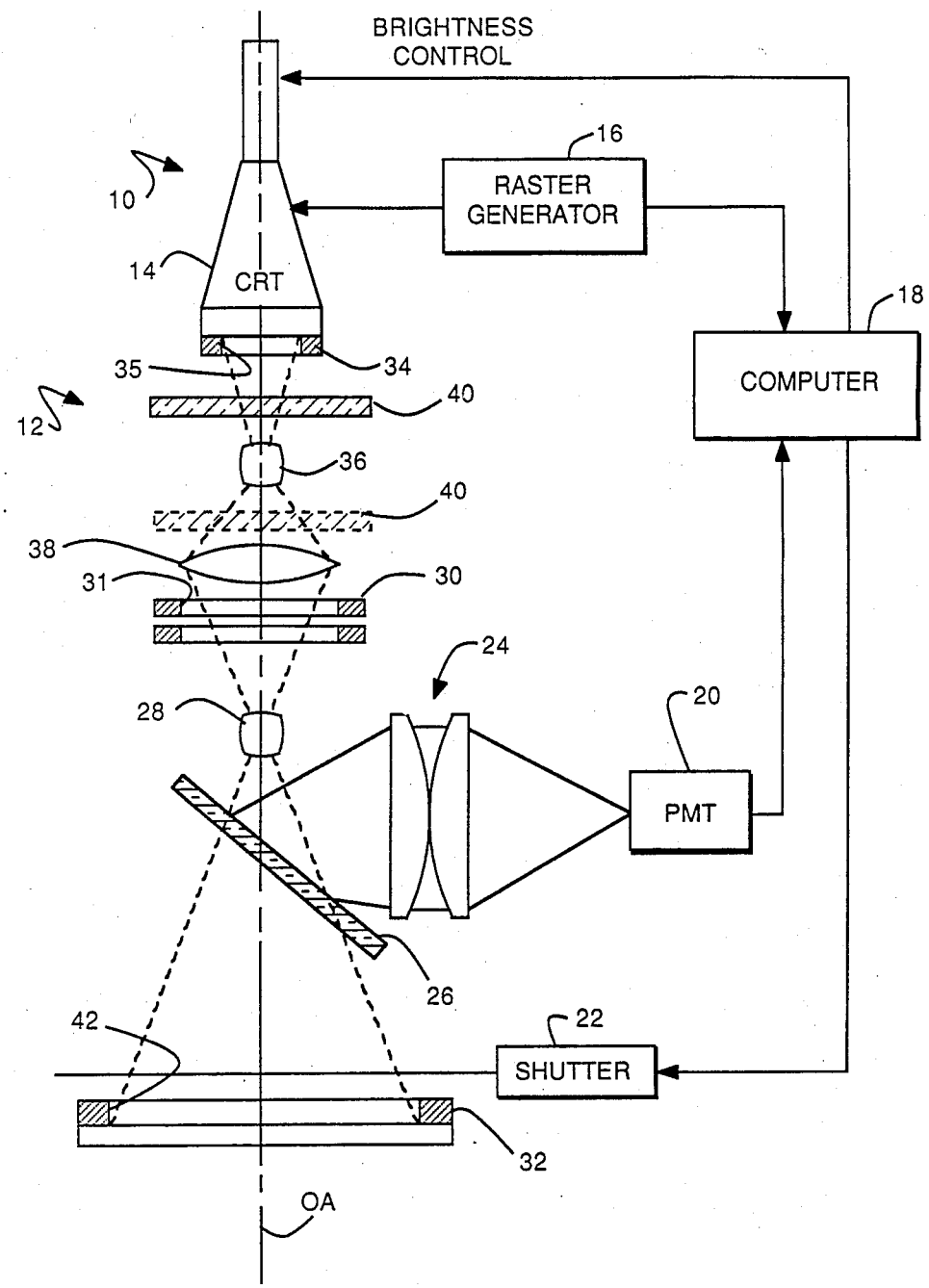

METHOD AND APPARATUS FOR REDUCING OPTICAL ARTIFACTS

BACKGROUND OF THE INVENTION

The present invention relates generally to photographic projection printing. In particular, it relates to the use of an optical system employing a diffusing surface which reduces the visual effects of artifacts.

In making photographic copies or enlargements of prints and/or transparencies it is desired to do so in a manner which facilitates the minimization of visually observable imperfections that might be projected to the print. Moreover, in making such enlargements it is often desirable to selectively increase and decrease the amount of light in different areas of the screen. For instance, it is desirable to increase light in the shadows and reduce the amount of light in the highlights. This approach produces prints which overcome or compensate for certain imbalances of tones in the transparency or print which is to be copied. Heretofore, it has been known to selectively shade different portions of a projected image, such as by using a mask. This technique is generally referred to as dodging. Conversely, selectively increasing the intensity of the exposure to preselected areas is a technique known as burning-in.

In electronic imaging or enlargement, instead of using a conventional light as a source of illumination, use is usually made of a flying spot scanner. In a flying spot scanner an electron beam is caused to move over the surface of a cathode ray tube. This is done in a preselected pattern to produce predetermined illumination areas having selected degrees of illumination. The brightness of these areas can be regulated by monitoring the light emerging from the transparency to be copied. This can be done by, for example, a phototube. In this manner, an automatic and simultaneous burning and dodging of various parts of the negative can be done in accordance with the local density of the negative.

In typical electronic enlarging applications, a raster pattern generator defines a pattern having rather coarse or large areas of illumination. For example, it may define a checkerboard pattern having areas of alternating brightness and darkness. In practice, these areas of illumination, when projected onto the transparency, sometimes define on the print rather sharp steps in brightness along the edges thereof. These sharp steps in brightness define a fringing type of optical artifact. Fringing produces unacceptable prints. Other kinds of artifacts are caused by imperfections in the illumination system, for instance, scratches or dirt and debris on the cathode ray tube. Artifacts are undesirable.

One known attempt to minimize artifacts, particularly of the fringing kind, is to smudge the sharp steps in brightness along the edges of the areas. Smudging or blurring can be accomplished by defocusing the cathode ray tube. However, there still exists an edge function on the illumination which while diminished tends nevertheless to be observable. Another approach for diminishing artifacts is described generally in commonly assigned U.S. Pat. No. 4,457,618. In that patent there is described an aperture mask placed in front of a flying spot illumination source. The aperture mask is a graded transmission density member having specific characteristics by which fringing effects or other artifacts for that matter are made to appear less noticeable. While the aperture mask is successful it nonetheless requires use of a special graded density filter.

SUMMARY OF THE INVENTION

In accordance with the present invention there is provided an improved apparatus and method for projecting an image of an image bearing material onto a sheet of image recording material.

Included is the step of positioning the image bearing material to be copied at a location. Suitably positioned in spaced relationship thereto is an image recording material. Incorporated in such process is the step of projecting an image of the image bearing material on the image recording material. The projecting step includes projecting preselected areas of illumination on the image bearing material in a predetermined manner. It is envisioned that the energy distribution of the illumination areas be altered so as to minimize the detrimental effects of optical artifacts.

In an illustrated embodiment, the noted altering step includes the step of diffusing the predetermined areas of illumination impinging on the image bearing material to an extent and in a manner which gradually blurs or reduces the effect of fringing or other artifacts. More specifically, the amount of this tailored blurring is such to make the noted objectionable artifacts visually unobjectionable in the prints.

In an illustrated embodiment the diffusing is done by a diffusing member, the position of which can be adjusted in such a manner as to provide the desired amount of diffusion for accommodating different types of images and/or areas of illumination.

In another illustrated embodiment, the amount of diffuseness is such as to create blurring from about 10 to 30 percent as great as the size of the smallest preselected area locally controllable by electronic means.

Among the objects and other features of the present invention are therefore: the provision of an improved method and apparatus for projecting images of image bearing material onto image recording material; the provision of an improved method of and apparatus for reducing the effects of optical artifacts in electronic printing so that they are visually unobjectionable in the print; the provision of a method and apparatus of the foregoing type wherein the reduction of optical artifacts is achieved by diffusing the source of illumination in a predetermined manner; the provision of a method and apparatus of the foregoing type wherein areas of varying illumination are projected onto the image that is to be recorded and the amount of blurring is related to the size of said areas; the provision of a method and apparatus of the foregoing type wherein the amount of diffusion is adjusted to accommodate different types of images to be printed and different types of illumination areas to be projected onto the image bearing material.

Other objects and further scope of applicability of the present invention will be made apparent upon a detailed description of the present invention when taken in conjunction with the drawing thereof.

Brief Description of the Drawing

The sole Figure of the drawing illustrates a diagrammatic view of an electronic enlarger incorporating the present invention.

Detailed Description

Reference is now made to the drawing, wherein there is shown an electronic enlarger 10 having incorporated therein an optical system 12. The electronic enlarger 10 includes besides the optical system 12 a cathode ray tube 14, a raster generator 16, a computer or microprocessor 18, a photomultiplier tube 20, a shutter system 22 and an objective lens 24, a beam splitter 26, a projection lens 28, a transparency mount 30, and a print mount 32.

Initial reference is made to the optical system 12. In this particular embodiment, the system 12 includes a field mask 34, a raster relay lens 36 and a field lens 38. It will be observed that the elements forming the optical system 12 tend to be coaxially arranged with respect to the face of the cathode ray tube and the transparency and print mounts 30, 32 along the optical axis OA. The optical system 12 includes a diffuser member 40 which can be positioned between the screen of the cathode ray tube 14 or CRT and the transparency mount 30. The purpose and function of the diffuser member 40 will be described subsequently.

Referring now to the field mask 34, it is butted flush against the screen of the cathode ray tube 14 and provided with an aperture 35. The peripheral edges of the aperture 35 define the total active illuminating parts of the illumination source of the enlarger 10. Interposed between the cathode ray tube 14 and the transparency mount 30 is the raster relay lens 36. This lens 36 is constructed to operate at about 1 to 1 conjugates so as to image the field mask aperture 35 onto and in registration with an aperture 31 in the transparency mount 30. For maximizing the amount of light which can pass through the aperture of the projection lens 28 from all areas of the transparency mount 30 there is provided the field lens 38. Preferably, the field lens 38 is located near the image plane of the raster relay lens 36. The projection lens 28 transmits all the details of the transparency to the image recording material.

In this embodiment the transparency mount 30 is adapted to receive within its aperture 31 either a negative or positive transparency (not shown) and the image recording material can be a suitable photosensitive sheet (not shown) preferably of the instant developing type. The projection lens 28 directs the light therethrough to the aperture 42 of the print mount 32. Such aperture defines the geometry of the enlargement which can be printed.

Referring back to the beam splitter 26, it is arranged to direct images of the lens 28 onto the face of a photomultiplier tube 20 by way of the objective lens 24. The beam splitter 26 has transmission properties such that only 5% of the light available for exposing the image recording material is directed to the photo tube 20. It will be appreciated that the present invention contemplates that the beam splitter 26 can in fact be replaced by a 100% mirror and be moved selectively in and out of the path of light travelling towards the image recording print material. In this regard, the mirror would be suitably interposed so that the transparency could have every point thereof read by the scanning flying spot. The information resulting from such process can be stored. Thereafter, the mirror could be removed and enlarging and enhancing techniques can be applied.

The electron beam of the cathode ray tube 14, as is well known, can be focused to a small cross sectional area on the luminescent face thereof. The flying spot is arranged to scan across such face so as to define a predetermined raster pattern (not shown). The raster pattern is created by the raster generator 16 which in turn is under the control of the computer 18 that is programmed in a well known manner. The computer 18 is also programmed to control the brightness of the illumination areas in response to the input received from the photomultiplier 20. The degree to which the electron beam of the CRT can be varied in location, size and intensity does not specifically form an object of the present invention. Therefore, reference is made to commonly assigned U.S. Pat. No. 4,457,618 which describes in greater detail the controlling of the flying spot.

A raster pattern which is contemplated for use with transparencies in this embodiment is in the form of a checkerboard pattern of preselected illumination areas or pixels. Each illuminated pixel or area can be varied in size, shape (e.g. squares, triangles), location as well as intensity. Thus, corresponding areas of the transparency can be made brighter or darker in accordance with a computer program. These areas tend to be relatively large in comparison to a flying spot.

The computer 18 also controls the shutter 22 and is, preferably, arranged to terminate exposure of the photosensitive print material via the computer as a function of the total amount of exposure on such print material.

Reference is now made to the diffuser 40. It is positioned intermediate the cathode ray tube 14 and the raster relay lens 36. The degree of diffuseness sought is such as to hide or blur the edges of each illumination area in a tailored fashion. Such diffuseness should not blur the images of the CRT too much. It is important that the diffuser 40 have a preselected amount of transmissiveness and be properly positioned relative to the CRT so that the degree of angular blur it provides is correct for the purposes contemplated. In the illustrated embodiment, the diffuser 40 can be comprised of etched or ground glass, having desired diffusion characteristics. Preferably the diffuser should provide a Gaussian-like diffusion. As is known, for a given amount of diffuseness there is a proper place to position the diffuser 40. In this regard, if there is too much diffusion one would move the diffuser 40 closer to the screen of the cathode ray tube 14. Conversely, if there is too little diffusion one would move the diffuser away from such screen. The diffuser 40, the cathode ray tube 14 and the raster relay lens 36 can also be positioned between the relay lens 36 and the transparency mount 30 and obtain the same results. The positioning is, of course, related to the desired degree of diffusion sought.

In the present embodiment, the diffuser 40 need not be used with an aperture mask or with the cathode ray tube being out of focus. However, the present invention does not preclude using such devices and techniques in conjunction with the diffuser 40. It is desirable not to put the diffuser 40 in a plane that is in focus such as immediately adjacent the cathode ray tube 14 or the transparency.

In the illustrated embodiment, the degree of angular blurring provided by the diffuser 40 should be only slightly more than a designated "pixel" size, or individually controlled illumination area of the CRT. For a given diffuseness there is a proper place to put the diffuser 40. If the blurring were greater than a single pixel size or illumination area then there is less control over enhancing the image. Preferably, the degree of blurring should be from about 10 to 30% as great as the width of the pixels or image areas. The degree of blurring sought can be a function of the kind of scene depicted in the transparency. In scenes with much detail throughout it might not be necessary to blur the edges of these illumination areas. However with other less detailed scenes having gentle illumination trends it might be difficult to not see blurring. Generally, the smaller the pixel size the better control. As noted, the amount of blurring should be about a pixel size. Blurring of more than a single pixel is contemplated by this invention, but not preferred.

After having described the basic construction of the electronic enlarger 10 which is made in accordance with the principles of the present invention a general description of its mode of operation will be set forth. Although a negative transparency is used in the following description, it will be appreciated that a positive transparency or print may be used.

To make an enlargement of a transparency, the transparency is placed into the transparency mount 30 so as to be in registration with the aperture 31. The cathode ray tube 14 is then actuated so that the flying spot which it generates scans across the field aperture mask in the raster pattern described above. Because the face of the cathode ray tube 14 is imaged onto the transparency, the flying spot exposes the image contained in the transparency spot by spot like the scanning system of a television screen. During the exposure the scanning beam moves over the entire transparency area in the raster pattern which assures that the spot passes over every point of the transparency for the same length of time. The intensity of the electron beam is automatically controlled according to the density of the negative area that the beam passes over at any instant.

For this purpose the light coming through the negative is monitored in the manner previously described by the photomultiplier tube 20 whose output is fed into the computer 18. The computer 18 in turn increases the intensity of the beam as a function of passing over high density areas, for example, and decreases the intensity of the flying spot as a function of passing over low density areas of the transparency. Thus, the computer program for this purpose acts in the manner of a negative feedback system, the flying spot intensity automatically compensating to a desired extent for variations in negative density so that negatives of varying degrees of contrast can be printed on a single grade of paper if desired. The benefits of such negative feedback for controlling the flying spot are more fully described in the last noted patent. Of course, positive feedback is feasible as well to increase the resulting contrast.

Preferably, the system is arranged so that the total exposure as previously mentioned is registered and cut off by the shutter 22 via the computer 18 when sufficient light has passed through the transparency to produce a correctly exposed print. Both the contrast and exposure level are preferably adjusted by appropriate scale factors which can be input in a well-known manner to the computer 18.

The manner in which the diffuser 40 operates to improve the image has been explained above. Briefly, however, the diffuser 40 serves to minimize sharp brightness gradients between different preselected areas or pixels. The pattern of these areas has been generated by the raster generator to burn or dodge selectively different areas of the transparency. The diffuser 40 does not impair any of the fine detail of the transparency being projected, but provides a Gaussian-like distribution or blurring of the light in a manner which hides or masks these sharp steps in brightness which would otherwise be visually objectionable at the edges of the pixels or illuminated areas.

The benefits of the raster pattern are not lost if the amount of blurring is slightly less than the width of each pixel or preselected illuminated area. Of course, the present invention contemplates that the amount of blurring may be greater than the width of a pixel.

Although the present invention has used the diffuser in conjunction with a CRT, it can be used in the same manner in conjunction with other sources of illumination, such as a laser scanner, etc.

Also, while this embodiment has used the effects of black and white for image enhancement purposes, it will be appreciated that colored light might be suitably employed. For example, during exposure a color wheel carrying red, green and blue filter could be selectively interposed in the light path to achieve color enhancement.

Since certain changes may be made in the above-described system and method without departing from the scope of the invention herein involved, it is intended that all matter contained in the description or shown in the accompanying drawing shall be interpreted as illustrative and not in a limiting sense.

What is claimed is:

1. A process for projecting an image of an image-bearing material onto image recording material comprising the steps of:
   projecting an image of the image-bearing material onto the image-recording material said projecting step includes illuminating the image-bearing material with preselected areas of illumination; and,
   altering the energy distribution of the illuminating areas, said altering step including diffusing generally all the illumination of the preselected areas to an extent and in a manner so that the marginal edges of the areas of illumination blur gradually so as to minimize the visual effects of artifacts on the image recording material such that they are visually unobjectionable.

2. The invention of claim 1 wherein the diffusing step is accomplished by at least a diffusion surface having predetermined transmission characteristics and is located at a desired position so at to generally encompass an optical path along which the illumination passes so as to provide desired influence over blurring of the marginal edges of the illumination areas such that optical fringing of the marginal edges is diminished.

3. The invention of claim 1 wherein the position of the diffusion surface is adjusted relative to the image recording material to influence blurring in a manner to accommodate different preselected areas of illumination and/or different types of images to be projected.

4. The invention of claim 3 wherein the amount of blurring is from about 10 to 30% as great as a dimension of a preselected area.

5. The invention of claim 4 wherein the step of illuminating the preselected areas includes the step of varying the intensity of illumination thereof as a function of the image bearing material.

6. An apparatus for projecting an image of an image-bearing material onto image recording material comprising:
   means for projecting an image of the image-bearing material onto the image-recording material;
   said projecting means includes means for illuminating the image-bearing material with preselected areas of illumination; and,
   means for altering the energy distribution of the illumination areas, said altering means includes means for diffusing generally all the illuminating to an extent and in a manner so that the marginal edges of the areas of illumination are blurred gradually so that they minimize the visual effects of artifacts on the image recording material so that they are visually unobjectionable.

7. The invention of claim 6 wherein said diffusing means includes at least a diffusion surface having predetermined transmission characteristics and being at a desired location so as to generally encompass an optical path along which the illumination travels so as to provide desired blurring of the marginal edges of said illumination areas such that they thereby diminish optical fringing of the marginal edges.

8. The invention of claim 6 including means for adjusting the position of said diffusion surface relative to the image recording material to influence blurring in a manner to accommodate different preselected areas of illumination and/or different types of images to be projected.

9. The invention of claim 8 wherein said diffusion surface provides from about 10 to 30% as great as a dimension of a preselected area.

10. The invention of claim 9 wherein said illuminating means illuminates said preselected areas by varying the intensity of illumination as a function of the image bearing material.

11. In a process for producing an electronically enhanced copy of a recorded image, the improvement comprising the steps of directing a pattern of illumination, along an optical path and having discrete areas of differing intensities arranged to enhance the reproduced image in said copy, from a source of illumination toward said recorded image and interposing an optical diffuser between said source of illumination and said recorded image so as to generally encompass said optical path to effect a preselected blurring of marginal edges of said discrete areas of differing illumination intensities thereby minimizing artifacts in said reproduced image.

* * * * *